INVENTOR

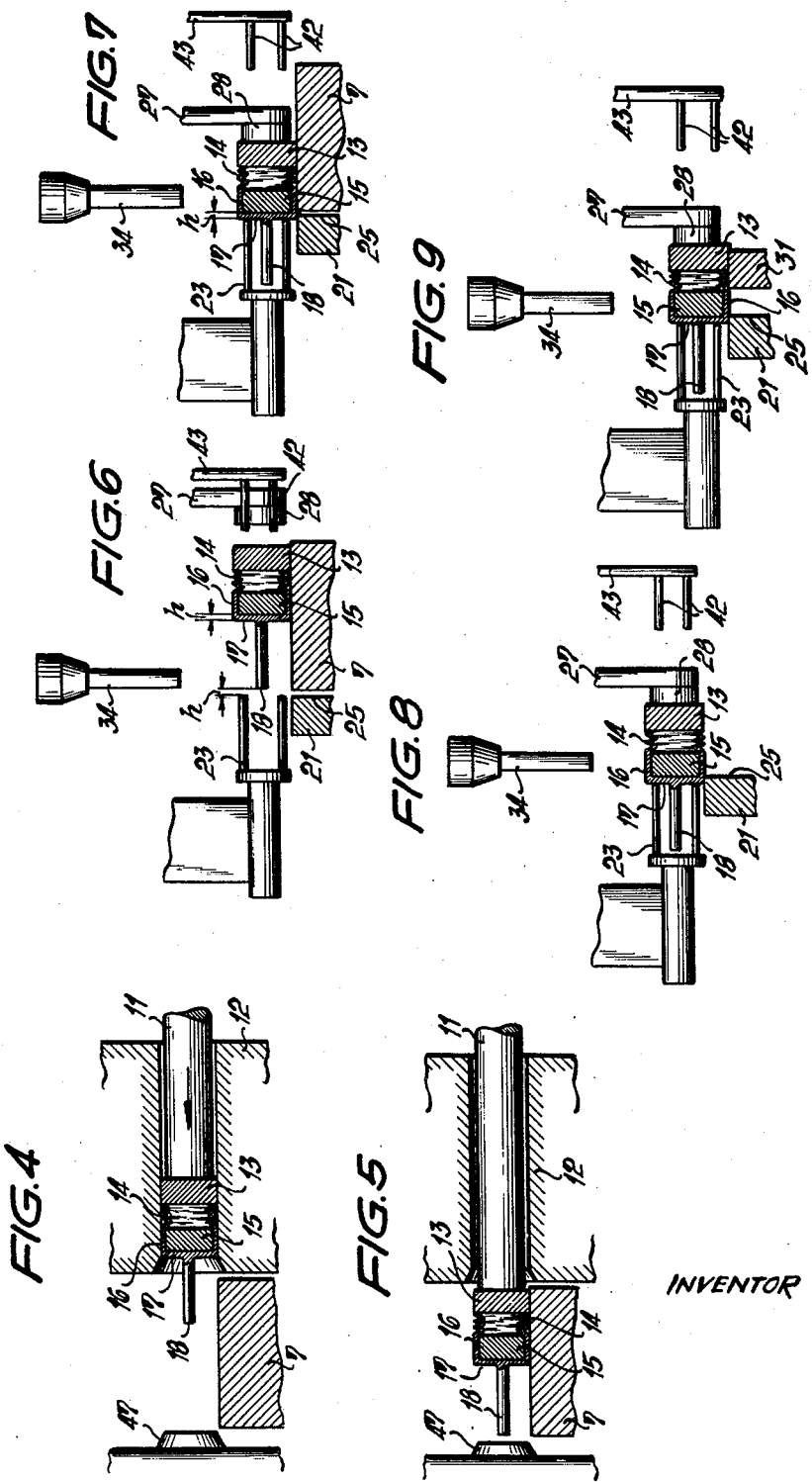

INVENTOR

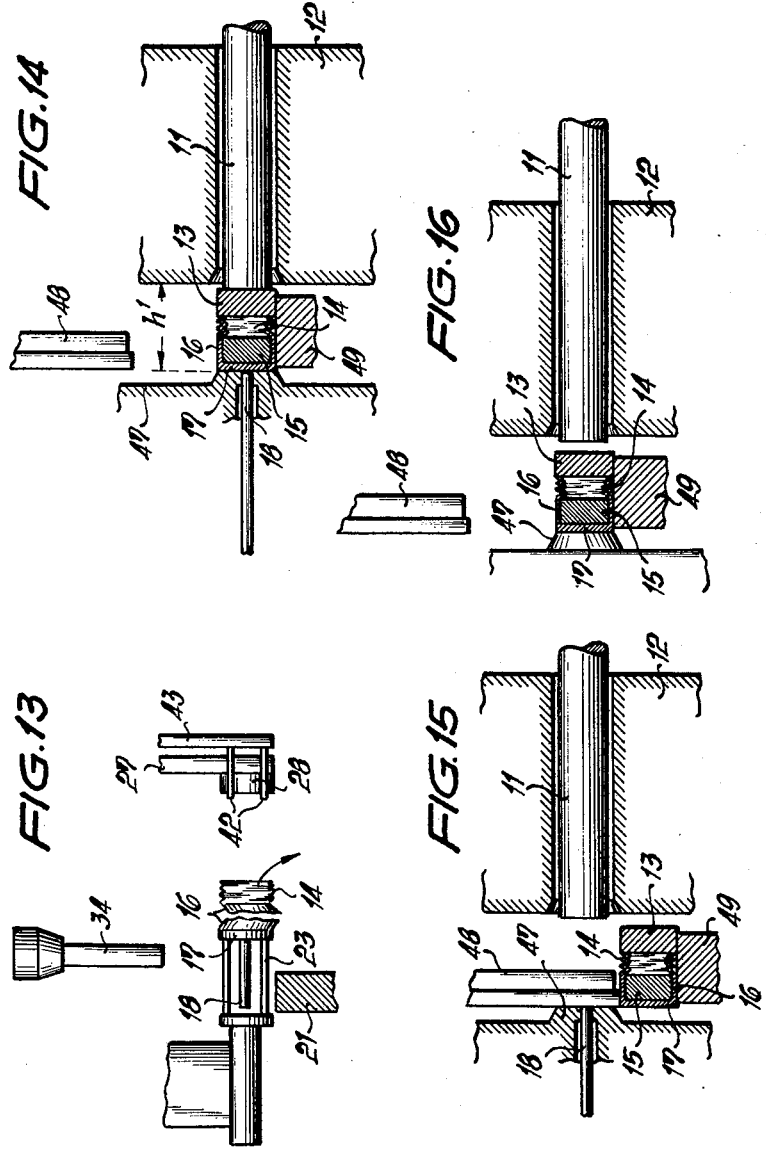

United States Patent Office 3,129,818
Patented Apr. 21, 1964

3,129,818
MEANS FOR SEVERING FROM AN EXTRUDED PRODUCT A PACK EXPELLED BY A PRESS RAM FROM THE CONTAINER OF A METAL EXTRUSION PRESS
Otto Behrendt, Dusseldorf, and Josef Schiffers, Rheindahlen, Germany, assignors to Schloemann Aktiengesellschaft, Dusseldorf, Germany
Filed Feb. 9, 1961, Ser. No. 88,058
Claims priority, application Germany Feb. 26, 1960
10 Claims. (Cl. 207—1)

This invention relates to means for severing from an extruded product the pack, consisting of an extrusion residue, an extrusion disc with shell, an extrusion skirt and a cleaning disc, and in some cases an extrusion stump, expelled by the press ram from the container of a metal-extrusion press. The object of the invention is to provide means for severing the pack automatically into its constituents, and discharging the extrusion disc and other individual portions to various collecting points. The operation of placing the expelled pack in the severing means is particularly important, because the expelled pack, when it is expelled by the press ram from the billet-container on to a trough or catch-pan, frequently tilts, and, by its indeterminable position, gives rise to difficulties in transporting it and bringing it into the severing appliance.

The invention consists first of all in providing, underneath a severing ram, as a support for the pack, a stationary severing prism and slidable or rockable severing prism, the distance between which is sufficient for the extrusion disc to be pushed through by the severing ram, the extrusion stump (if any) and the extrusion residue remaining lying upon the stationary prism, while the skirt and the cleaning disc come to lie upon the movable prism.

The invention is illustrated by way of example in the accompanying drawings, in which:

FIGURES 4 and 5 are diagrammatic representations of certain essential parts, on the section line IV—IV in FIGURE 2;

Figure 2:
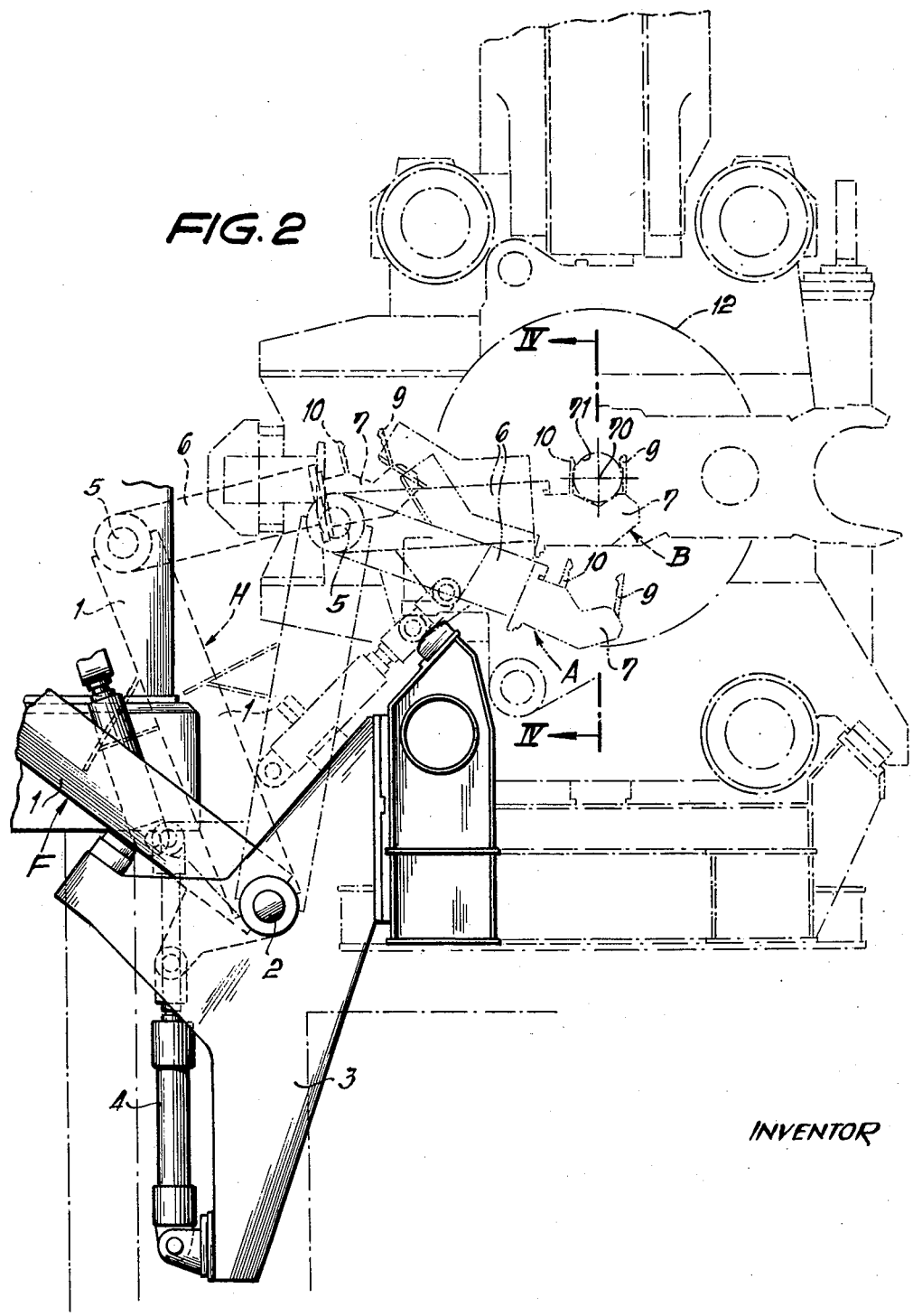
FIGURE 2 shows part of the severing means in a different position, with part of the extrusion press.
Figure 3:
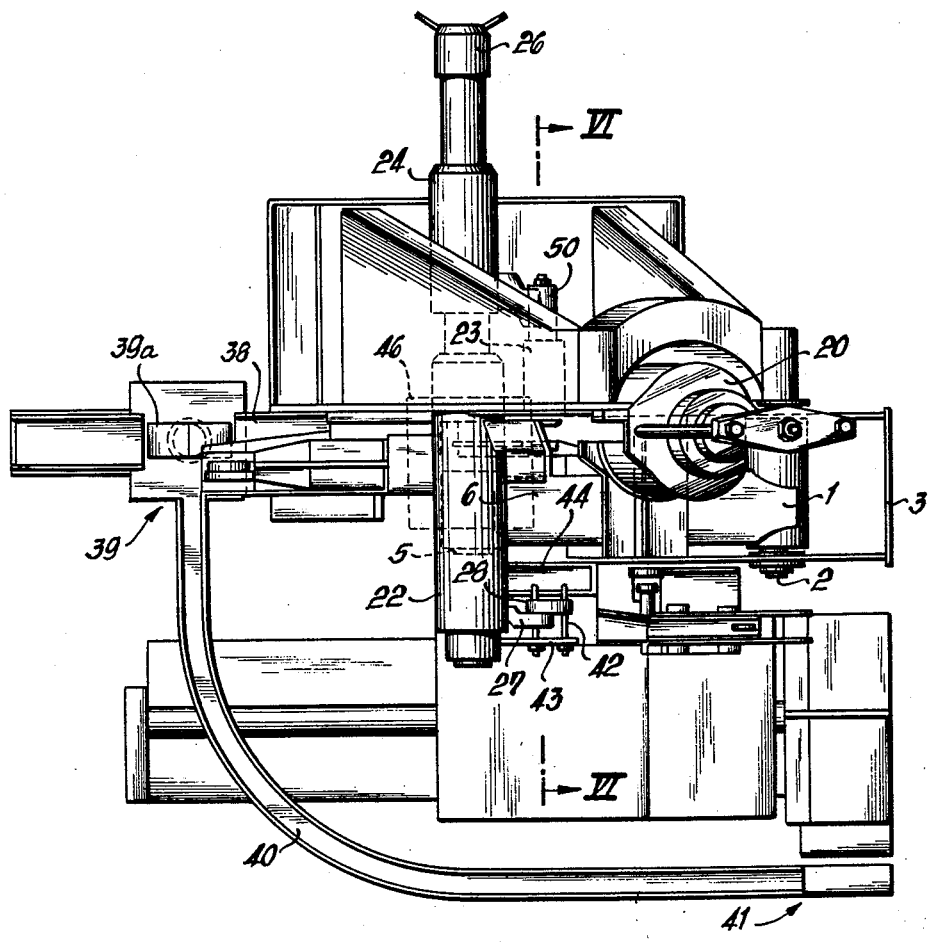
FIGURE 3 is a plan view of the apparatus shown in FIGURE 1.
Figure 10:
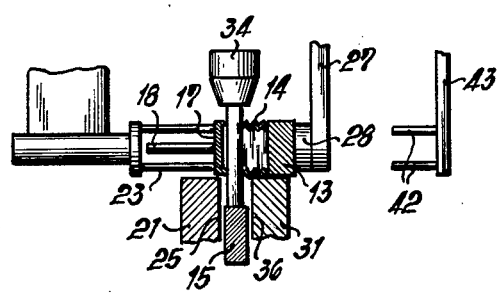

FIGURES 6 to 13 are diagrammatic representations of the essential parts, on the section line VI—VI in FIGURE 3, through the axis of inclination of the severing means 20; and FIGURES 14 to 16 likewise show a section on the line IV—IV in FIGURE 2, in the arrangement which the essential parts assume when the severing of the extrusion residue from the extruded product is effected not with a saw but by means of shears.

In FIGURE 2, 70 denotes the axis of the container 12 of a metal-extrusion press. The container 12 has a container bore 71, out of which the residual pack is expelled. The container 12 can travel upon two slideways, of which only one, 72, is shown. About a pivot 2, which is parallel to the extrusion axis 70, a rocking arm 1 is rockable. The pivot 2 is located on a bearing block 3, to which also a hydraulic oscillating cylinder 4 is connected, which can rock the rocking arm 1. To a bearing 5 on the rocking arm 1 is pivoted a lifting arm 6, which carries at its outer end a catch-pan 7 for the residual pack to be expelled from the container. By a hydraulic lifting cylinder 8, the lifting arm 6 can be rocked about the bearing 5. It is possible, with the said means, to rock the catch-pan 7 from the position B, in FIGURE 2, underneath the extrusion axis, right into a position E (FIGURE 1), in which the catch-pan 7 passes beneath the axis of inclination of the severing means 20. Below the severing ram 34 of the severing means 20 are provided two severing prisms, namely a stationary severing prism 21 and a slidable or rockable severing prism 31, and upon these the residual pack rests when the severing ram 34 is acting upon it. The severing prism 31 may be capable of travelling in and out in a stationary frame. The cored-out extrusion disc, after being severed from the extrusion residue and from the skirt, is supplied, by way of guiding channels 37 and 38, to a lowering and turning appliance 39, to which it can be supplied, by way of a roll-down path 40, for fresh use. The extrusion residue and the cleaning disc are guided as hereinafter explained, to other collecting points.

After the termination of the extrusion operation, and the sawing-off of the extruded profile from the residual stump 18 of the profile, the billet-container 12 travels so far back, oppositely to the extrusion direction, that the catch-pan 7 can be rocked into the press between the die 47 and the billet-container 12, by means of the oscillating cylinder 4. During this, the lifting arm 6 is moved, by the lifting cylinder 8, before the rocking-in, into the lowered position, marked A in FIGURE 2. The lowering is required in order that the resilient gripper arms 9 and 10 mounted on the pan 7 may be able to rock in underneath the residual profile stump projecting from the billet-container 12, FIGURE 4. After the rocking-in of the rocking arm 1, the lifting cylinder 8 raises the lifting arm 6 with the catch-pan 7 to the position marked B in FIGURE 2, in the middle of the press.

The press ram 11 presses the pack which is contained in the billet-container 12, and which consists of the cleaning disc 13, the extrusion skirt 14, the extrusion disc 15, the shell 16, the extrusion residue 17 and the profile stump 18, into the catch-pan 7, FIGURES 4 and 5. During this, the resilient gripper arms 9 and 10, which have the length of the catch-pan, are somewhat pushed asunder. The pack is in this way reliably held in its place. For the better pushing-in of the pack, the catch-pan 7 and the gripper arms 9 and 10 are bevelled on the entry side. By the oscillating cylinders 4 and 8, the catch-pan 7, with the pack held fast, is now rocked out of the press to the severing means 20. In the position E the central axis of the pack is then located exactly on the central axis of the stationary severing prism 21, which is located beneath the severing ram 34. The pack is now pushed out of the catch-pan 7 by a push-in cylinder 22, mounted laterally outside the middle of the severing means 20, so that it comes to lie upon the stationary severing prism 21 of the severing means 20.

The further operations of the severing are illustrated in FIGURES 6 to 13. For the correct timing of the longitudinal displacement of the entire pack by the push-in cylinder 22, with its arm 27 and the permanently magnetic disc 28 secured thereto, the abutment 23 of the push-out cylinder 24 is adjusted to the dimension $h$ behind the severing edge 25 of the stationary severing prism 21, FIGURES 6 and 7.

Since, with an automatic extrusion programme, the height $h$ of the extrusion residue always remains the same, a single adjustment of the abutment 23 on the push-out cylinder 24 by means of an adjusting handwheel 26, FIGURE 3, is sufficient for any programme, for fixing the exact position of the extrusion disc 15 in relation to the severing edge 25, independently of any uneven thickness of the extrusion disc 15, the cleaning disc 13 and the extrusion skirt 14. In this condition the expelled pack is clamped axially fast between the arm 27, with its permanent magnet 28, and the abutment 23. Thereupon the lifting arm 6, actuated by the lifting cylinder 8, rocks away obliquely downwards in a clockwise direction, the resilient grippers 9 and 10 opening out to the position F, indicated in FIGURES 1 and 8.

Figure 1:
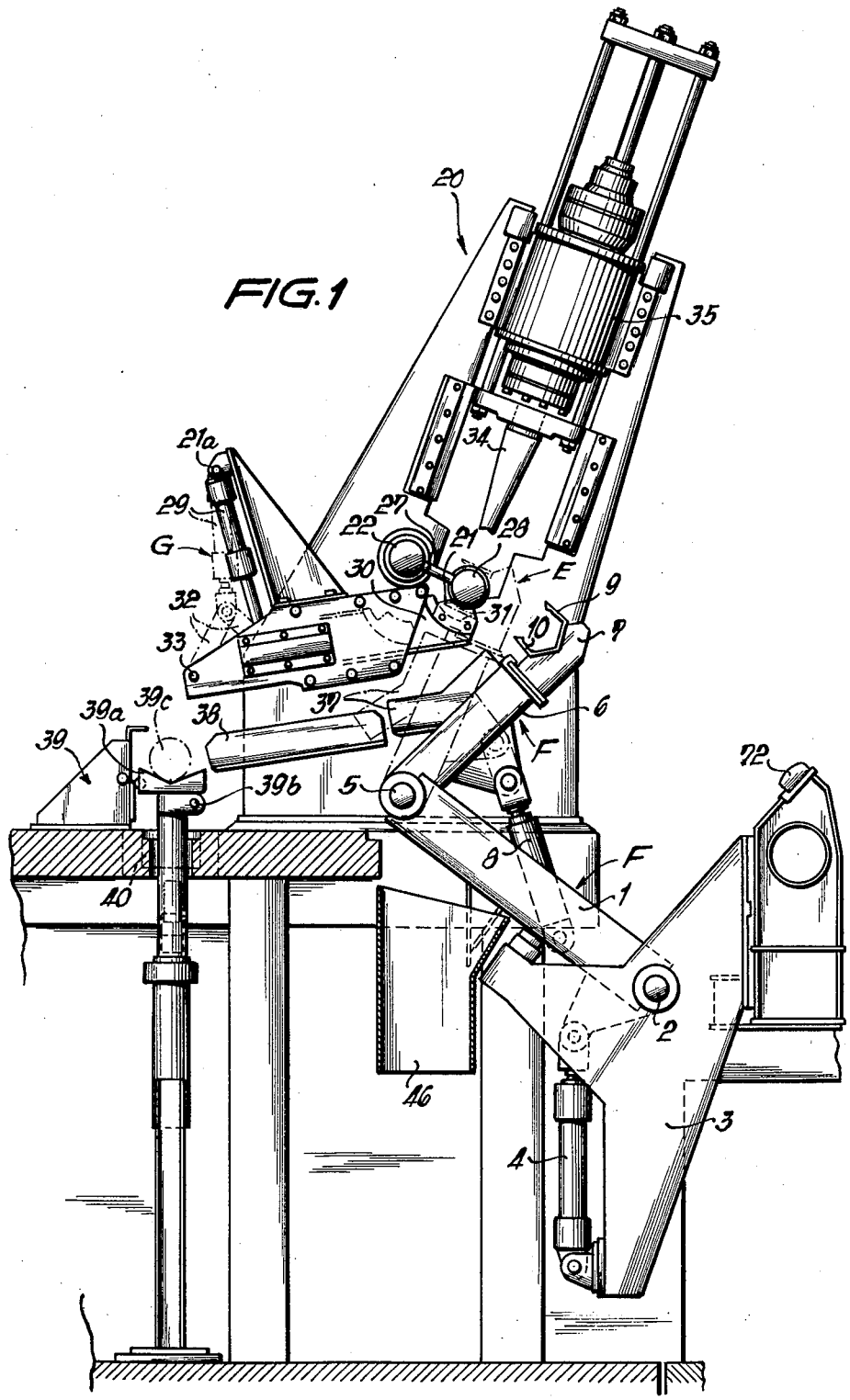
FIGURE 1 shows a view of the severing means, arranged close beside an extrusion press.

A displacement cylinder 29 now moves inwards from its position G, shown in dotted lines in FIGURE 1, and in so doing moves the extrusion-skirt support 30, with the severing prism 31 secured thereto, from its initial position to the middle of the severing means. During this operation, guiding links 32 are brought out of the angular position into a straight position, for the purpose of taking up the forces occurring during the severing operation in the longitudinal direction of the extrusion-skirt support 30, the pivotal point 33 of the link shown on the left, and the axis 21a, serving as fixed points for the movement operation. The condition after the entry of the severing prism 31 is shown in FIGURE 9. After the entry of the extrusion-skirt support 30, the push-in cylinder 22 is hydraulically blocked, so that during the ensuing severing operation, the push-in cylinder 22, after the severing, cannot grip the severing ram 34. The severing ram 34, actuated by the severing cylinder 35, now descends, and forces the extrusion disc 15 out of the shell 16, which is torn or crushed in this operation. It will be noted that the severing is not effected by a cutting action, but by simply pushing the extrusion disc out of the middle of the pack. The extrusion residue 17 now rests upon the severing edge 25 of the stationary severing prism 21, while the extrusion skirt 14 bears upon the severing edge 36 of the severing prism 31, FIGURE 10. The arm 27 of the push-in cylinder 22, and the arm 50 of the push-out cylinder 24, are guided yieldingly downwards about the common axis of the push-in cylinder 22 and the push-out cylinder 24, in order that they may be able to follow, in a downward direction, any sliding movement occurring during the severing.

After the extrusion disc 15 is pressed right through below the bearing edges of the severing prisms 21 and 31, it falls on to a run-off channel 37 of the lifting arm 6 located in a take-up position, and rolls over this channel and along a stationary run-off track 38 towards the left (FIGURE 1) on to an extrusion-disc lowering and turning device 39, from which, lowered and rotated, it rolls to a run-off channel 40, and thence to the extrusion-disc delivery point 41.

Figure 11:
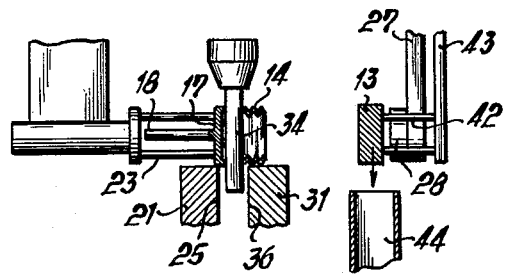
Figure 12:
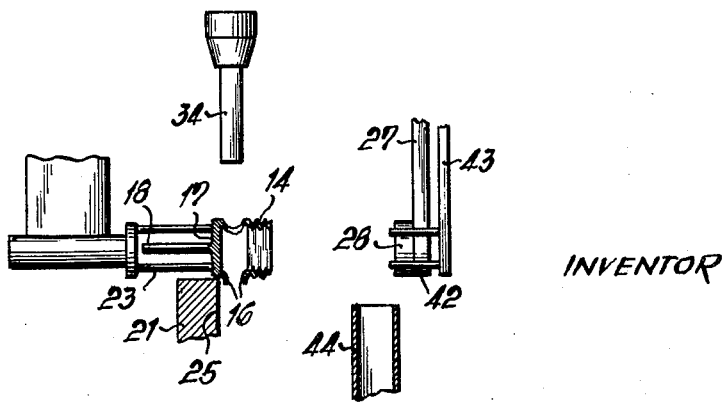

After the removal of the extrusion disc 15 from the pack, the push-in cylinder 22, with its arm 27 and its permanent magnet 28 secured thereto, travels back into the initial position, FIGURE 11. The cleaning disc 13 adhering to the permanent magnet 28 is taken back with it, and is stripped off by releasing rods 42, which are secured to a fixed abutment 43. The releasing rods 42 pass through holes in the permanent magnet 28. The cleaning disc 13 falls into a drop-shaft 44. Simultaneously with the return of the push-in cylinder 22 (removal of the cleaning disc), the extrusion-skirt support 30 travels into the initial position, while the rocking arm 1 moves in a clockwise direction into a mid position H, between the position F and the position A. The severing ram 34 returns into its upper retracted position, FIGURE 12, whereupon the pushout cylinder 24, with its abutment 23, pushes the remainder of the pack, namely the parts 14, 16, 17 and 18 outwards over the edge 25 of the severing prism 21. As shown in FIGURE 13, these remaining parts fall into a drop-shaft 46 beneath the floor. The push-out cylinder 24, with its abutment 23, after the ejection of the said remaining parts, travels back again into its original left-hand position, FIGURES 6 and 7.

The rocking arm 1 now swings back into its initial left-hand position F, ready to be called back afresh, at the command of the press, for the purpose of rocking in and bringing out a fresh pack.

With the working cycle hereinbefore described, the cutting-off of the extruded product from the extrusion stump 18 is effected by means of a saw. The saw, not shown, which has effected the sawing operation behind the die before the cycle of movement described above, may work either in a downward or in an upward direction.

If the cutting-off of the extruded profile from the extrusion residue is effected not with a saw but with shears, the following method of working is adopted. The operations according to FIGURES 4 and 5 are omitted, and are replaced by the operations according to FIGURES 14 to 16. Shears 48, working from above, effect the cutting-off of the extrusion residue exactly in front of the die. FIGURE 14 indicates that after the extrusion operation the press ram 11 remains stationary against the pack, and the billet-container 12 is drawn back, towards the right, from the die 47, by the distance $h^1$. In this condition the rocking arm 1, with the lifting arm 6 and the catch-pan 7, rocks into the press in a clockwise direction (FIGURE 2), the lifting arm 6 again assuming, when rocking in, the lowered position A, in order that the gripper arm 9 may be able to rock past underneath the pack.

Since the expelled pack, in cutting-off with the shears 48, is shorter by the dimension of the residual profile stump 18, a correspondingly shorter catch-pan 49 is mounted on the lifting arm 6. After the rocking arm 1 has rocked into the press, the lifting arm 6 is raised by the lifting cylinder 8, the resilient gripper arms 9 and 10 being somewhat pressed asunder by the pack, and clamping the pack resiliently in the raised position. Thereupon the shear blade 48 descends, the ram 11 being at the same time somewhat withdrawn, for the purpose of releasing the axial clamping of the pack.

The shear blade 48 sets itself upon the upper edge of the pack, and cuts off the extrusion residue 17 from the extruded product, FIGURE 16. In this operation the piston of the lifting cylinder 8 is pressed downwards against the constant accumulator pressure. After the cutting, the shear blade 48 reascends into its initial position, thus allowing the accumulator pressure in the lifting cylinder 8 to raise the lifting arm 6 until it has raised the catch-pan 49 up to the middle of the press again.

After the shear blade 48 has arrived in its uppermost position, the bringing-out operation begins, and the introduction of the pack into the severing means proceeds as described above.

The press itself is not the subject of the present invention. Details of such a press are to be found in the German patent applications:

Sch 27,314 Ib/7b, of the 22.1.60 (S 1196);
Sch 27,268 Ib/7b, of the 14.1.60 (S 1197);
Sch 27,269 Ib/7b, of the 14.1.60 (S 1132);
Sch 27,325 Ib/7b, of the 25.1.60 (S 1215);

and in the corresponding applications in the U.S.A., Great Britain, France and Italy, which claim the priorities of these German patent applications.

We claim:
1. Means for removing an extrusion disc from a pack expelled from the container of an extrusion press, the pack comprising an extrusion residue, an extrusion disc, a shell enclosing the extrusion disc, an extrusion skirt, a cleaning disc, and in some cases also an extrusion stump, and the removing means comprising: a stationary prism, a prism movable into and out of a position adjacent to the stationary prism, in which the prisms support the pack with the extrusion residue resting on the stationary prism and with the extrusion skirt and the cleaning disc resting on the movable prism, and a severing ram adapted to act radially upon the shell and the extrusion disc within it while the pack is thus resting upon the prisms, so as to thrust the extrusion disc out of the pack into the space between the prisms.

2. Means for removing an extrusion disc from a pack as claimed in claim 1, further comprising an abutment and an arm, constituting a pair of gripping members, the abutment being adjustable according to the thickness of the particular extrusion residue accruing, and the arm being displaceable, relatively to the abutment, in the axial direction of the pack.

3. Means for removing an extrusion disc from a pack as claimed in claim 2, when the pack includes the stump of an extruded profile, one of the gripping members being adapted to engage around this extrusion stump and to bear upon the extrusive residue while the other gripping member bears upon the cleaning disc, and this latter gripping member further comprising a magnet for holding and removing the cleaning disc.

4. Means for removing an extrusion disc from a pack as claimed in claim 3, further comprising an abutment adapted to strip the cleaning disc off the magnet.

5. Means for removing an extrusion disc from a pack as claimed in claim 2, further comprising an abutment for adjusting a normal rear position of the gripping member that bears upon the extrusion residue, this gripping member being movable out of the said rear position so as to push away the extrusion residue, over the stationary prism, after the movable prism has been shifted into its outer position.

6. Means for removing an extrusion disc from a pack as claimed in claim 5, further comprising means, including toggle levers, for moving the movable prism towards the axis of the severing ram in a direction making an acute angle with that axis, the toggle levers reaching their straight-line position when the movable prism reaches its operative position in relation to the severing ram, and thereby strongly resisting any force tending to push the movable prism back.

7. Means for removing an extrusion disc from a pack as claimed in claim 1, further comprising: a rockable catch pan, means for rocking the catch pan into an inner position in which it is co-axial with the container of the press, and out of that position into an outer position in which it is co-axial with the stationary prism and is located beside the latter, resilient gripper arms on the catch pan adapted to receive the pack from the container of the press when the catch pan is in its inner position, and to hold it while the catch pan is rocking into its outer position, and means for pushing the pack out of the resilient grippers and holding it in a position in which the extrusion residue is resting upon one edge of the stationary prism.

8. Means for removing an extrusion disc from a pack as claimed in claim 7, the means for rocking the catch pan comprising a rocking arm turning about a stationary pivot, a lifting arm pivoted to the free end of the rocking arm, the catch pan being secured to the free end of this lifting arm, and hydraulic piston-and-cylinder means for effecting the movements of the arms and of the catch pan.

9. Means for removing an extrusion disc from a pack as claimed in claim 8, further comprising a run-off channel provided on the lifting arm that carries the catch pan and located underneath the stationary and movable prisms, for carrying away the extrusion disc as it falls off the said prisms.

10. Means for removing an extrusion disc from a pack as claimed in claim 9, further comprising stationary run-off channels adapted to receive the extrusion disc from the run-off channel provided on the lifting arm and to convey it to a collecting point.

References Cited in the file of this patent

UNITED STATES PATENTS

| | | |
|---|---|---|
| 1,110,810 | McDonald | Sept. 15, 1914 |
| 1,194,728 | Ennes et al. | Aug. 15, 1916 |
| 1,715,138 | Lothrop | May 28, 1929 |
| 2,301,674 | Andrews | Nov. 10, 1942 |
| 2,346,719 | Aske | Apr. 18, 1944 |
| 2,704,388 | West | Mar. 22, 1955 |
| 2,721,613 | Rice | Oct. 25, 1955 |
| 2,914,170 | Kent | Nov. 24, 1959 |